United States Patent [19]

Takata

[11] Patent Number: 4,828,404
[45] Date of Patent: May 9, 1989

[54] SELF-ALIGNING ROLLER BEARING
[75] Inventor: Hirotoshi Takata, Yokohama, Japan
[73] Assignee: Nippon Seiko Kabushiki Kaisha, Tokyo, Japan
[21] Appl. No.: 194,213
[22] Filed: May 16, 1988
[51] Int. Cl.⁴ ............................................. F16C 19/36
[52] U.S. Cl. .................... 384/450; 384/558; 384/568; 384/569; 384/571
[58] Field of Search ............... 384/450, 558, 568, 569, 384/571, 516

[56] References Cited
U.S. PATENT DOCUMENTS

| | | |
|---|---|---|
| 4,227,754 | 10/1980 | Kellström . |
| 4,334,721 | 6/1982 | Satoh et al. ........................ 384/450 |
| 4,345,800 | 8/1982 | Hofmann et al. ................... 384/558 |
| 4,557,613 | 12/1985 | Tallian et al. ...................... 384/568 |
| 4,565,457 | 1/1986 | Flander ............................. 384/450 |
| 4,705,411 | 11/1987 | Kellström ......................... 384/450 |

FOREIGN PATENT DOCUMENTS

| | | |
|---|---|---|
| 52-49541 | 12/1977 | Japan . |
| 55-31328 | 8/1980 | Japan . |
| 57-61933 | 12/1982 | Japan . |
| 60-175818 | 9/1985 | Japan . |
| 1441802 | 7/1976 | United Kingdom . |
| 1487579 | 10/1977 | United Kingdom . |

Primary Examiner—Lenard A. Footland
Attorney, Agent, or Firm—Shapiro and Shapiro

[57] ABSTRACT

In a self-aligning roller bearing having a plurality of spherical rollers disposed between the track surface of an inner race and the track surface of an outer race, the bus line on the track surface of the inner race is formed by a curve comprising a plurality of radii of curvature, and there are predetermined relations among the radius of curvature of the bus line on the rolling surface of the rollers, the radius of curvature of the bus line on the track surface of the outer race, the radius of curvature of the bus line on the track surface of the inner race corresponding to the axially central portion of each roller and the radii of curvature of the bus lines on the track surface of the inner race corresponding to the axial end portions of each roller.

3 Claims, 2 Drawing Sheets

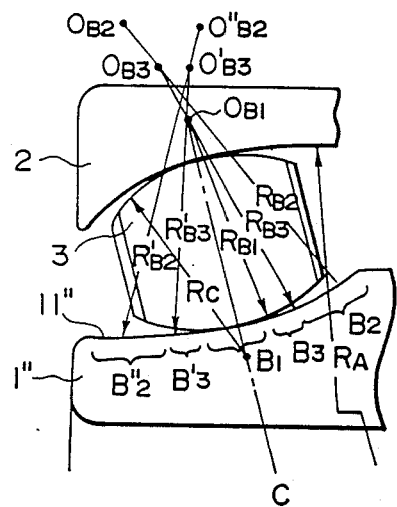
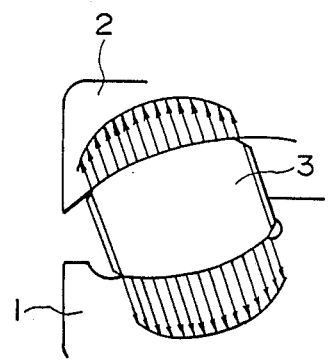
FIG. 3              FIG. 4
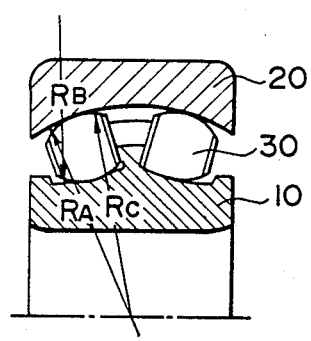
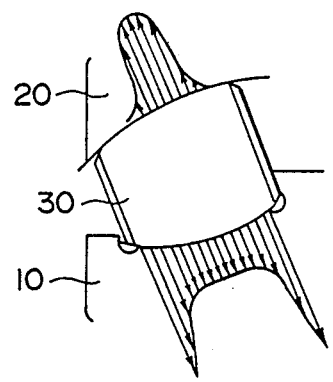
FIG. 5              FIG. 6

SELF-ALIGNING ROLLER BEARING

BACKGROUND OF THE INVENTION

1. Field of the Invention

This invention relates to a self-aligning roller bearing in which occurrence of edge stress on the surface of contact between rollers and track surfaces is eliminated or decreased.

2. Related Background Art

In the prior-art self-aligning roller bearing (see FIG. 5 of the accompanying drawings), contacts between an inner race 10 and rollers 30 and between an outer race 20 and the rollers 30 are contacts between single arcs when viewed in a plane containing the bus line of the roller 30. This leads to the following disadvantages:

(1) If the rate of contact between the arc of the bus line of the roller (radius of curvature $R_C$) and the arcs of the bus lines of the track surface (the radius of curvature $R_B$ of the inner race and the radius of curvature $R_A$ of the outer race) is made great, as seen in the state of stress distribution on the surface of contact between the inner race 10 and the roller 30 show in FIG. 6 of the accompanying drawings, the stress in the end portions of contact sharply increases (edge stress occurs) with an increase in the load, and this results in the problems of a short life, abrasion, seizure, etc.

(2) If the rate of contact between the arc of the bus line of the roller 30 and the arcs of the bus lines of the track surfaces is made small to avoid the occurrence of such edge stress, the range of the load in which a state of point contact is brought about increases, and this results in the problems of a short life, reduced rigidity, abrasion, etc. The state of stress distribution on the surface of contact between the outer race 20 and the roller 30 shown in FIG. 6 is that in the case where the rate of contact between the roller 30 and the outer race 20 has been made small.

(3) When a decrease in the rotational torque of the bearing is contemplated by suitably selecting the rate of contact between the inner race and the rollers and the rate of contact between the outer race and rollers, the problem mentioned under item (1) or (2) above arises depending on the magnitude of the load and therefore, design is not easy.

A technique which solves the above-noted problems is disclosed in Japanese Laid-open Patent Application No. 60-175818. That is, it is shown in it that the bus line of one or both of the track surface of the inner race and the track surface of the outer race is formed by a curve comprising a plurality of radii of curvature and thereby edge stress can be decreased.

However, the actual application of the technique disclosed in the above-mentioned publication would leave some problems still left to be solved.

It is difficult in design and manufacture to properly form the curves of the track surfaces in conformity with the condition under which the bearing is used. Where the bus line of only one of the track surfaces is formed by a curve comprising a plurality of radii of curvature, unless the arc of the other track surface is properly designed, edge stress will increase on the other track surface side and the life of the bearing will become shorter. Also, where the track surface of the outer race is formed by a bus line using a curve comprising a plurality of radii of curvature, the position of contact between the outer race and the rollers will change due to the aligning property between the outer race and the rollers and thus, they will contact each other at other position than the original position of contact aiming at a long life and a high performance, and therefore the intended purposes cannot be achieved.

Thus, according to the technique disclosed in the above-mentioned publication, the purposes of decreasing edge stress and obtaining a long life of a self-aligning roller bearing cannot be fully achieved.

SUMMARY OF THE INVENTION

The present invention has as its object the provision of a self-aligning roller bearing in which edge stress can be effectively decreased to thereby realize a long life.

The present invention provides a self-aligning roller bearing of the following construction as means for achieving the above object.

It is a self-aligning roller bearing having a plurality of spherical rollers disposed between the track surface of an inner race and the track surface of an outer race, characterized in that when the radius of curvature of the bus line on the rolling surface of the rollers is $R_C$ and the radius of curvature of the bus line on the track surface of the outer race is $R_A$ and the bus line on the track surface of the inner race is formed by a curve comprising a plurality of radii of curvature and the radius of curvature of the bus line on the track surface of the inner race corresponding to the axially central portion of each roller is $R_{B1}$ and the radii of curvature of the bus lines on the track surface of the inner race corresponding to the axial end portions of each roller are $R_{B2}$ and $R_{B2}'$, respectively, said bearing is constructed so as to satisfy the following relations:

$$R_C < R_{B1} < R_{B2}, R_{B2},$$

$$R_C < R_A < R_{B2}, R_{B2}'$$

$$R_{B1} \div R_A \text{ or } R_{B1} < R_A$$

BRIEF DESCRIPTION OF THE DRAWINGS

FIG. 3 is a cross-sectional view of the essential portions of a self-aligning roller bearing according to a third embodiment of the present invention.

FIG. 4 shows the stress distribution in the embodiment of the present invention.

FIG. 5 is a cross-sectional view of the essential portions of a self-aligning roller bearing according to the prior art.

FIG. 6 shows the stress distribution in the prior-art self-aligning roller bearing shown in FIG. 5.

DESCRIPTION OF THE PREFERRED EMBODIMENTS

Figures 1, 2:
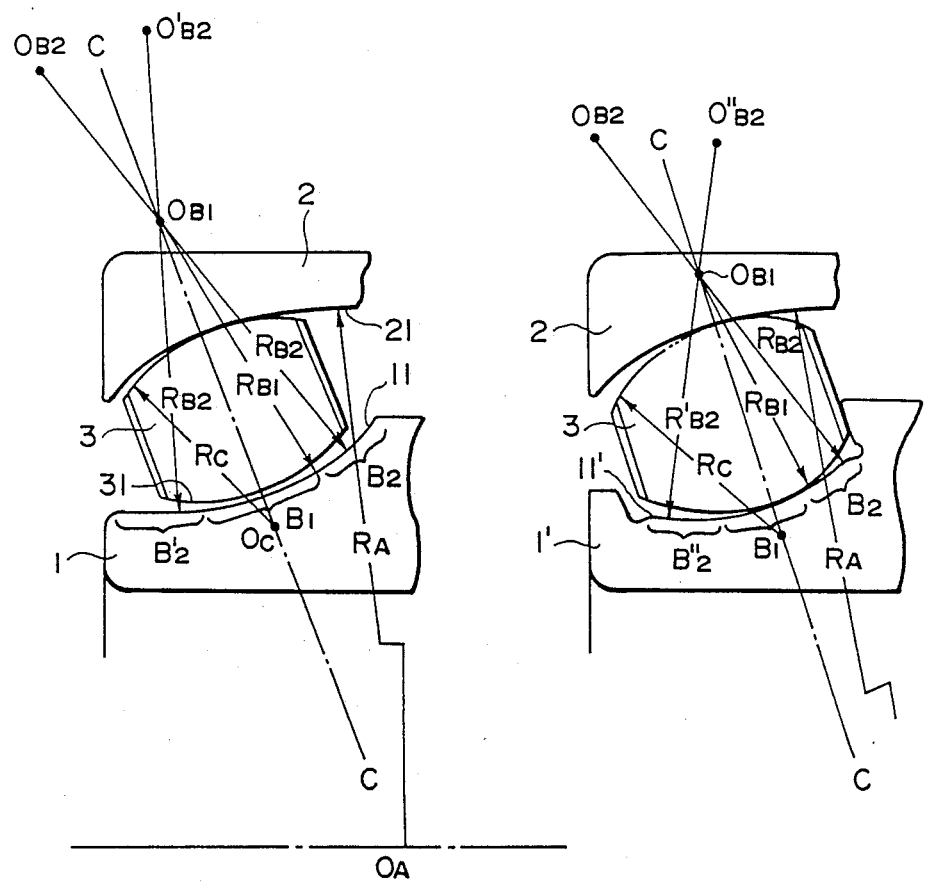
FIG. 1 is a cross-sectional view of the essential portions of a self-aligning roller bearing according to a preferred embodiment of the present invention.
FIG. 2 is a cross-sectional view of the essential portion of a self-aligning roller bearing according to a second embodiment of the present invention.

Some embodiments of the present invention will hereinafter be described with reference to the drawings.

FIGS. 1 to 3 show self-aligning roller bearings according to first, second and third embodiments, respectively, of the present invention. The first embodiment of FIG. 1 shows an example in which the track surface of an inner race is symmetrical with respect to the center of contact C—C of a spherical roller, and the second and third embodiments of FIGS. 2 and 3 show examples in which the track surface of an inner race is asymmetrical.

The self-aligning roller bearing of each embodiment is symmetrical with respect to the center of rotation and is bilaterally symmetrical in each figure and therefore, only the cross-section of the upper left portion is shown.

In the first embodiment, an inner race 1 and an outer race 2 are both annular and they are disposed on the same center of rotation with the inner race 1 as the inside. The inner race 1 and the outer race 2 have track surfaces 11 and 21 facing each other. The track surface 11 of the inner race is formed in two rows on the outer peripheral surface of the inner race 1, and the track surface 21 of the outer race is formed as a spherical surface of a radius of curvature $R_A$ having its center of curvature $O_A$ at the center of the bearing. Thus, the track surface of the outer race has a bus line comprising a single radius of curvature $R_A$.

A roller 3 is barrel-shaped and a plurality of such rollers are disposed at predetermined intervals between the track surface 11 of the inner race and the track surface 21 of the outer race by a retainer, not shown. Each roller 3 is rotation-symmetrical with respect to the center of rolling, and is formed with a rolling surface 31 with the radius of curvature $R_C$ as a bus line. Thus, the center of curvature $O_C$ of the radius of curvature $R_C$ is on the center of contact C—C.

The track surface 11 of the inner race is provided by a bus line comprising two radii of curvature $R_{B1}$ and $R_{B2}$ being rotated about the center of the bearing. That is, it is formed so that the opposite side areas of the center of contact C—C of the roller 3 provide an area $B_1$ having the radius of curvature $R_{B1}$ whose center of curvature $O_{B1}$ is on the center of contact C—C and the opposite sides of the area B1 provide area B2 and B2' having the radius of curvature $R_{B2}$. It is to be understood that the area B2 is the inner side of the bearing and the area B2' is the outer side of the bearing. The centers of curvature $O_{B2}$ and $O_{B2}'$ of the radius of curvature $R_{B2}$ forming the areas B2 and B2' may be at any positions, but if the centers of curvature $O_{B2}$ and $O_{B2}'$ are placed on the extensions of the radius of curvature $R_{B1}$ at the opposite ends of the area B1, the radius of curvature will continuously change from the area B1 to the areas B2 and B2'. Also, where the centers of curvature $O_{B2}$ and $O_{B2}'$ are at any other positions than the above-mentioned positions, a level difference occurs in the portion near the point of intersection between the radii of curvature $R_{B1}$ and $R_{B2}$ and therefore, the areas at the opposite sides of the point of intersection may be worked so as to be smoothly connected together by an approximate arc so that they may change smoothly.

As described above, the track surface 11 of the inner race has a bus line in which the area of contact of the roller 3 is of the radius of curvature $R_{B1}$ and the opposite end areas of the roller 3 are of the radius of curvature $R_{B2}$.

The radii of curvature $R_A$, $R_{B1}$, $R_{B2}$ and $R_C$ forming the track surfaces 11 and 12 of the two races and the bus line of the rolling surface 31 of the roller 3 are determined so as to satisfy the following relations:

$$R_C < R_{B1} < R_{B2} \tag{1}$$

$$R_C < R_A < R_{B2} \tag{2}$$

$$R_{B1} \doteq R_A \text{ or } R_{B1} < R_A \tag{3}$$

The second embodiment shown in FIG. 2 will now be described. The difference of the second embodiment from the first embodiment is only the track surface 11' of the inner race 1' and therefore, parts of the second embodiment similar to those of the first embodiment are given similar reference numerals and need not be described.

The track surface 11' of the inner race is obtained by rotating a bus line comprising three radii of curvature $R_{B1}$, $R_{B2}$ and $R_{B2}'$. An area B1 of a radius of curvature $R_{B1}$ having its center of curvature $O_{B1}$ on the center of contact C—C is provided on the opposite sides of the center of contact, and an area B2 of a radius of curvature $R_{B2}$ having $O_{B2}$ as its center of curvature extends inwardly of the bearing, and an area B2'' of a radius of curvature $R_{B2}'$ having $O_{B2}''$ as its center of curvature extends outwardly of the bearing. The positions of $O_{B2}$ and $O_{B2}''$ may be any positions as in the first embodiment, but they may preferably be connected together by a smooth arc when there occurs a level difference in the seam.

The difference between the first embodiment and the second embodiment lies in the radii of curvature $R_{B2}$ and $R_{B2}'$ forming the respective areas B2' and B2''. In the second embodiment, the radii of curvature $R_A$, $R_{B1}$, $R_{B2}$ and $R_{B2}'$ are determined so as to satisfy the following relations (1)' and (2)' and the aforementioned relation (3):

$$R_C < R_{B1} < R_{B2}, R_{B2}' \tag{1'}$$

$$R_C < R_A < R_{B2}, R_{B2}' \tag{2'}$$

Next, in the third embodiment of FIG. 3, description will be made only of the track surface 11'' of the inner race 1'' which forms the only difference from the first and second embodiments, and the other identical parts are given identical reference numerals and need not be described.

The track surface 11'' of the inner race in the third embodiment is such that the area B1 near the center of contact C—C is bus-line-formed by an arc of a radius of curvature $R_{B1}$ having its center of curvature $O_{B1}$ on the center of contact, the area B2 near the inner end surface of the bearing of the roller 3 is bus-line-formed by an arc of a radius of curvature $R_{B2}$ having its center of curvature $O_{B2}$, the area B2'' near the outer end surface of the bearing of the roller 3 is bus-line-formed by an arc of a radius of curvature $R_{B2}'$ having its center of curvature $O_{B2}'''$, the area B3 between the areas B1 and B2 is lined and bus-line-formed by an arc of a radius of curvature $R_{B3}$ having its center of curvature $O_{B3}$ and the area B3' between the areas B1 and B2'' is linked and bus-line-formed by an arc of a radius of curvature $R_{B3}$ having its center of curvature $O_{B3}'$.

The radii of curvature $R_{B1}$, $R_{B3}$, $R_{B2}$ and $R_{B1}$, $R_{B3}'$, $R_{B2}'$ are increased in the named order, and are determined so as to satisfy the above-mentioned relations (1)', (2)' and (3).

The seam of each arc is formed so as to change smoothly, as previously described.

According to the self-aligning roller bearing of each embodiment of the present invention described above, as shown in FIG. 4, when a load is applied to the self-aligning roller bearing, the stress distribution thereof becomes approximately average, and as compared with the prior art shown in FIG. 6, an increase in the stress at the position corresponding to the end portion of the roller 3 is avoided and the stress is rather decreased. Thus, according to the present invention, edge stress is reliably prevented.

If the track surface of the inner race is formed as described above, the distribution of the rolling surface contact stress between the inner race 1, 1', 1" and the roller 3 becomes such that occurrence of high stress is controlled and tends to be uniformized because when the load is relatively small, the surface having an arc of a relatively small radius of curvature $R_{B1}$ as the bus line chiefly bears the load. On the other hand, when the load is relatively great, the load also extends to the surface having an arc of a relatively great radius of curvature $R_{B2}$, $R_{B2}'$, $R_{B2}''$ as the bus line to thereby prevent or reduce the end stress and occurrence of high stress is controlled and the stress distribution tends to be uniformized.

The radius of curvature $R_A$ of the bus line arc of the outer race 2 is made substantially equal to or greater than $R_{B1}$ and smaller than $R_{B2}$ and therefore, when viewed in a cross-section perpendicular to the axis of rotation of the bearing, the contact between the roller 3 and the inner race 1, 1', 1" is contact between convex surfaces, whereas the contact between the roller 3 and the outer race 2 is contact between a convex surface and a concave surface and therefore, if it is taken into consideration that the maximum contact stress decreases, the distribution of the rolling surface contact stress between the outer race 2 and the roller 3 becomes such that both when the load is relatively small and when the load is relatively great, the central portion stress and the edge stress are considerably suppressed and become about the same as those between the inner race 1, 1', 1" and the roller 3. Moreover, the bus line arc of the outer race 2 is a single arc of a radius of curvature $R_A$ and therefore, even if an aligning action is effected, there will occur no relative difference in shape in the contact with the roller 3 and there will not arise the inconvenience that the stress distribution will change.

Also, as compared with the technique of changing the curvature of the roller and thereby preventing a occurrence of the edge stress, the present invention is easier in terms of handicraft and has lesser irregularity of the accuracy of the dimensions and shape of the roller, and more readily permits the state of contact between the rollers and the track surface to be held best.

Further, in the prior-art bearing, in order to realize low rotational torque and low temperature rise, there have been limitations in the combination of the rate of contact between the inner race and the rollers and the rate of contact between the outer race and the rollers, and this has in some cases led to the shorter life of the bearing, whereas in the present invention, the rate of contact between the inner race 1, 1', 1" and the rollers changes in a portion of contact and therefore, there are no such limitations, and low rotational torque, low temperature rise and moreover a long life can be realized.

In the above-described embodiments, the centers of the radii of curvature of the curves forming the track surface of the inner race and the track surface of the outer race are positioned on the line passing through the center of contact C—C of the roller 3, whereas these centers need not necessarily be on the line passing through the center of contact C—C, but may deviate from such line. In short, consideration may be given so that the radius of curvature of the track surface of the inner race generally increases from the central portion toward the end portion of the roller.

Accordingly, the curves forming the track surfaces are not limited to exact arcs, but may be a combination of quadratic curves, cubic curves, etc., and it is ideal if the curvature can be continuously changed.

As described above, according to the present invention, the radii of curvature of the rollers and the track surface of the outer race are made constant, the track surface of the inner race is formed by a bus line of plural radii of curvature which increase from the center of contact of the roller toward the opposite sides thereof, and the radii of curvature are made to have predetermined relations therebetween and therefore, the rate of contact between the track surface of the inner race and the rollers decreases from the center of contact toward the end portion and the occurrence or increase of edge stress can be effectively prevented or mitigated and moreover, the state of point contact in which the stress near the center has remarkably increases as compared with the stress near the end portion can be avoided and thus, a decrease in rigidity can also be avoided.

Accordingly, the self-aligning roller bearing of the present invention is free of occurrence of edge stress and has a long life.

I claim:

1. A self-aligning roller bearing having a plurality of spherical rollers disposed between the track surface of an inner race and the track surface of an outer race, characterized in that when the radius of curvature of the bus line on the rolling surface of the rollers is $R_C$ and the radius of curvature of the bus line on the track surface of the outer race is $R_A$ and the bus line on the track surface of the inner race is formed by a curve comprising a plurality of radii of curvature and the radius of curvature of the bus line on the track surface of the inner race corresponding to the axially central portion of each roller is $R_{B1}$ and the radii of curvature of the bus line on the track surface of the inner race corresponding to the axial end portions of each roller are $R_{B2}$ and $R_{B2}'$, respectively, said bearing is constructed so as to satisfy the following relations:

$$R_C < R_{B1} < R_{B2}, R_{B2}'$$

$$R_C < R_A < R_{B2}, R_{B2}'$$

$$R_{B1} \doteq R_A \text{ or } R_{B1} < R_A$$

2. A self-aligning roller bearing according to claim 1, characterized in that $R_{B2} = R_{B2}'$.

3. A self-aligning roller bearing according to claim 1, characterized in that $R_{B2} \neq R_{B2}'$.

* * * * *